United States Patent [19]

Kamprath

[11] Patent Number: 4,922,464
[45] Date of Patent: May 1, 1990

[54] PORTABLE MIXER FOR PROCESSING FOOD

[75] Inventor: Karl-Heinz Kamprath, Wiesbaden, Fed. Rep. of Germany

[73] Assignee: Braun Aktiengesellschaft, Kronberg, Fed. Rep. of Germany

[21] Appl. No.: 334,682

[22] Filed: Apr. 6, 1989

[30] Foreign Application Priority Data

May 4, 1988 [DE] Fed. Rep. of Germany ....... 3815177

[51] Int. Cl.$^5$ .............................................. B01F 15/06
[52] U.S. Cl. .................................... 366/349; 366/601; 366/144
[58] Field of Search ............... 366/349, 601, 297, 300, 366/342, 343, 344, 144, 149; 417/366; 51/266, 268

[56] References Cited

U.S. PATENT DOCUMENTS

| | | | |
|---|---|---|---|
| 2,987,636 | 6/1961 | Jepson | 366/601 |
| 3,533,715 | 10/1970 | Gross | 366/300 |
| 3,993,416 | 11/1976 | Kato | 417/366 |
| 4,032,261 | 6/1977 | Madan | 366/297 |

*Primary Examiner*—Robert W. Jenkins
*Attorney, Agent, or Firm*—Fish & Richardson

[57] ABSTRACT

The invention is directed to an electrically powered portable mixer for processing food, including a housing 1 accommodating a motor 19, a gear box 20 and a receptacle means 21 connected to the gear box 20 for the fastening of processing tools 5. Provided on the housing 1 and extending transversely to the longitudinal axis 24 of the housing 1 is a handle 2 for holding the portable mixer, with air vents 11 which ensure the passage of cooling air through the housing 1 being provided on the housing 1 for cooling the motor 19. To cool the motor 19, the handle 2 incorporate at least one air duct 22 in which the cooling air is conducted towards the housing from outside and/or away from the housing 1.

29 Claims, 5 Drawing Sheets

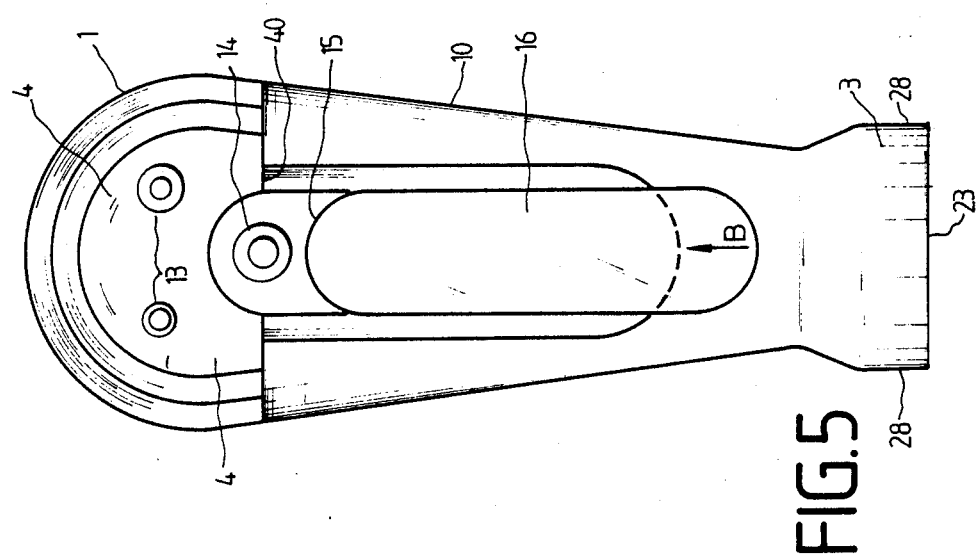
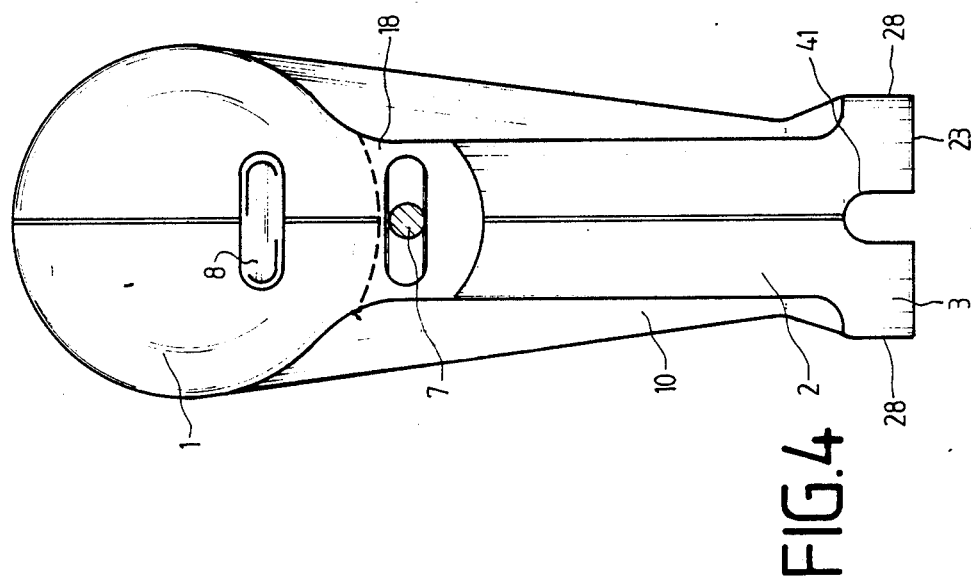

PORTABLE MIXER FOR PROCESSING FOOD

This invention relates to a portable mixer for processing food, including a housing accommodating a motor, a gear box and a receptacle means connected to the gear box for the fastening of processing tools, with a handle for holding the portable mixer extending laterally away from the housing, and with air vents which ensure the passage of cooling air through the housing being provided on the housing for cooling the motor.

Portable mixers of this type are suited not only for mixing, kneading, beating, but also for cutting food material.

Further, for example, portable mixers are known ("Krups 3 Mix 4000" from the brochure "Das Aktuelle Programm '88" by the firm of Robert Krups Stiftung & Co. of Solingen, pages 16 to 19) which include a horizontal handle attached parallel to the housing or to the housing body and have on the underside of the housing body sockets for inserting the kneading and mixing tools. For reasons of gear design, it is, however, necessary for the cutting rod to be driven on the rear side of the appliance. Apart from the fact that the operator's arm has to be bent sharply already when using the kneading and mixing tools on a table top of normal height, handling of the appliance in the position tilted by 90° as required for the cutting rod is not possible without involving an additional awkward position of the operator's wrist or arm.

Moreover, the arrangement of a total of two sockets for introducing the processing tools because of the different rotational speeds required is inconvenient per se, the more so since the socket for the cutting rod is located in the rear air vent area of the appliance. When the appliance is placed on its rest, this then has the disadvantage that the cutting rod points vertically upwardly so that food material still clinging to the cutting rod may enter the motor housing. If the appliance is placed down on its side, food will drip on the table top. Here, too, the disadvantage is that the air vents necessary for cooling are in too close proximity to the processing tools and accordingly too close to the food material to be processed, so that the food may absorb the smell of motor fumes exiting from the housing. Also, the motor of the portable mixer may become contaminated by unclean cooling air.

This appliance entails the further disadvantage that the housing extending normal to the processing tools obstructs the view into the working bowl in which the food material is processed.

From the brochure No. 362100 r 5 of the firm of Gottlob Widmann & Sohne KG of Schwenningen (Neckar), a portable mixer of the type referred to is already known in which all inserts for mixing, kneading, cutting, beating, emulsifying, etc. are driven on the same side, that is, the underside of the appliance, wherein a more or less cylindrical housing has successively arranged therein in a confined space the drive motor and the gear box which, among other functions, also serves to receive the processing tools, the arrangement being vertically spaced when the portable mixer is in use.

For handling this portable mixer, an elongated handle is provided which extends radially outwardly approximately from the center of the housing substantially perpendicular to its longitudinal axis. Air vents for introducing or expelling cooling air are arranged on the housing between the motor and the gear box, that is, in the proximity of the processing tool.

The arrangement of the air vents in the proximity of the processing tools which are thus also in the immediate vicinity of the food material to be processed results in the disadvantage that particles as flour which are stirred up by the processing tools during the processing of dough, for example, are drawn inside through the air vents by the motor fan, thus contaminating the motor. This contamination may cause a premature failure of the portable mixer.

It is a further disadvantage that the air stream exiting from the fan of the portable mixer may be directed into the mixing bowl already when the portable mixer is held at a slight angle or when using particularly tall bowls. The flour in the mixing bowl is thereby stirred up and may be drawn into the housing by the fan wheel through the intake vents, which may likewise result in the disadvantages described above.

Still further, it is to be considered less advantageous in this appliance that the arrangement of the air vents in the area of the operator's hand causes a constant stream of cold air to be directed against this hand which may be an inconvenience for the operator in the long run. The appliance can only be placed on the table top by laying it on its side. In doing so, the processing tools with the food material clinging thereto will contact the table top making it unnecessarily dirty.

It is, therefore, an object of the present invention to improve upon the known portable mixers such that the handle necessarily provided serves not only a holding and guiding function for the appliance but assumes further functions permitting an improvement in the maneuverability and/or a reduction in the contamination hazard caused by the cooling air. According to the invention, this requirement is satisfied in that at least one air duct is formed in the handle to direct the cooling air towards the housing from the outside and/or away from the housing. The arrangement cf the air duct in the handle as disclosed in the invention positively prevents the cooling air required during operation of the portable mixer from being directed to the food material to be processed. This is also ensured if the portable mixer is held at a slight angle. By supplying cooling air to the appliance radially from outside and/or expelling it radially outwardly away from the appliance, stirring up of flour, for example, by the cooling air is avoided while at the same time stirred up flour which, for example, may be present during mixing, cannot be drawn into the portable mixer. Because the cooling air which issues from the housing of the portable mixer and in many cases carries the disagreeable smell of the motor parts, does not act on the food, the taste of the food is not adversely affected either. In consequence, the arrangement of the invention make's it possible for the first time that the cooling air required for the portable mixer does not flow in the close proximity of the food and is not drawn in by the mixer either.

To keep the cooling air as far away as possible from the tools processing the food such as dough hooks, whisk beaters, etc., an improvement of the invention provides at the free end of the handle air inlet and/or air outlet orifices in the form of air vents forming the beginning and, respectively, the end of the air duct. Thus, the handle may be used both for the supply of cold air and for the discharge of the air heated by the motor. Forming the handle as both an inlet and discharge channel is also possible by means of a partition wall. In this arrangement, it will be particularly advantageous if the air vents direct the air stream out of the portable mixer transversely to the direction of the processing tool and, if possible, also in a slight upward direction, so that it is at all times ensured, also with the portable mixer held at any possible angle, that the air stream does not enter the bowl receiving the food, into which bowl the tools processing the food material extend.

To ensure ease of manufacture of the air vents, the free end of the handle is provided with an extension substantially parallel to the longitudinal axis of the housing and the processing tool, the air vents being provided on the side of the extension remote from the housing. The extension according to the invention may be directly formed on the handle, for example, or it may be flanged thereto. According to the invention, this extension further affords the affords the advantage of serving at the same time as a heel rest on which the portable mixer is placed if the enter of gravity of the portable mixer drops approximately centrically on the extension. This results in the further advantage that the processing tools do not come into contact with the table top and make it unnecessarily dirty when the mixing operation is temporarily interrupted.

In an improvement of the invention, the handle is advantageously formed on the upper area of the housing opposite the processing tool and extends downwardly at an angle. The angular arrangement of the handle on the housing of the portable mixer allows a comfortable position of wrist and upper arm and forearm, involving a minimum possible expenditure of force. Accordingly, the predominant part of the holding forces is exerted by the muscular upper arm which is less susceptible to fatigue, whereas the wrist bears against the stop of the joint in the longitudinal direction of the forearm as a result of which no appreciable holding forces occur at the wrist. Thus; the angular position of the handle relative to the longitudinal axis of the housing has to be selected such that the wrist bears against its lower joint stop. In this arrangement, an angle of between 60° and 75°, preferably 68°, has proved to be particularly advantageous. The angular handle arrangement further affords the advantage of allowing the portable mixer to be placed down to temporarily interrupt the process even in the absence of an extension on the handle, this being accomplished by hanging that part of the portable mixer that lies between the handle and the housing on the rim of a mixing bowl. Where this area between the handle and the housing is particularly narrow, the portable mixer may even be clamped on the bowl rim.

To accomplish an optimum cooling effect with portable mixers having particularly powerful motors, in an improvement of the invention an arm extending substantially vertically to the longitudinal axis of the housing is provided in the lower area of the housing more proximate to the processing tool, this arm including a further air duct for cooling the motor. This additional arm makes it possible to introduce the air into the housing through the handle from above and to discharge it to the outside through the arm at the lower end. As a result, the cooling air is conducted through the housing in one direction only which eliminates the need for complex return channels which are necessary if the cooling air in the housing has to be returned again to the handle. An optimum cooling effect is accomplished in that the cooling air circulates around the motor.

Particular ease of manufacture of the housing parts is afforded by connecting the arm with the handle through the extension and by providing on the extension air vents for both the admission and the discharge of air from the air ducts. Connecting the arm with the handle through the extension ensures a particularly flexurally stiff and stable housing arrangement.

To prevent the air duct inducing air from aspirating air from the air duct discharging hot air, the air vents on the extension are separated from each other by a web member.

To build the housing and thus the portable mixer to an overall length as compact as possible, the arm serves the additional function of accommodating the gear box or part thereof. This thus affords the possibility of having the arm receive parts of the gearing which otherwise are to be arranged in the motor area. If necessary, the arm may be provided with an enlargement in the area proximate to the housing. This enables the portable mixer to be built to much smaller dimensions than is the case in conventional appliances.

To enable both left- and right-handed users to maneuver the portable mixer, a cavity for receiving and guiding a joint of a power cord is provided in the upper part of the extension adjacent to the handle, the joint being sealed against the air duct, with the swivel direction of the joint of the power cord being in the longitudinal direction of the handle. This advantageous configuration enables both left- and right-handed users to handle the portable mixer, because the power cord is no longer arranged on the side of the portable mixer.

By arranging the power cord in swivel fashion, it can be swivelled parallel to its rest when the portable mixer is placed down, so as to prevent the cord from interfering with the rest. To ensure that air is admitted and discharged only through the air vents, the joint of the power cord is sealed against the air duct. This eliminates, from the outset, disturbing air noise and other inlets.

To avoid overheating of the portable mixer when placed on its rest with the motor still running, the air vents extend also into the sides of the extension. These then enable the cooling air to be discharged and admitted on the side while the motor is still running. A discharge or supply of cooling air with the portable mixer placed on its rest is also ensured by the provision of raised foot elements on the rest.

In an improvement of the invention, a tongue slidable transversely to the processing tools is provided on the underside of the arm, by means of which torgue at least one socket and the associated receptacle means can be closed. Thus, the arm serves not only as an air duct or as a receptacle for gear parts, but allows at the same time the mounting of a closing device for at least one socket receiving a processing tool, when the socket is not needed.

For a secure location of the power cord on the appliance after use of the portable mixer, it is suggested in an improvement of the invention that a channel be formed on the radial outer circumference of the extension. This enables the power cord to be wrapped around the channel without problems, preventing it from slipping off the appliance in which event it would be in the way when the portable mixer is placed on its rest.

The requirement identified above is furthermore satisfied in that the motor and the processing tool are successively arranged in the longitudinal direction of the housing, that the free end of the handle includes a rest provided on the side remote from the housing and extending substantially parallel to the longitudinal axis of the housing, and that the rest is dimensioned such that, on placing the portable mixer on its rest, the force of gravity acting from the portable mixer vertically on the plane of the rest impinges on the rest. This facilitates the handling of the portable mixer substantially because it has only a single rest on which the portable mixer can be placed on the table top without the processing tools touching its surface; this occurrence is entirely obviated if the rest extends substantially parallel to the longitudinal axis of the housing which also corresponds to the direction of all processing tools adapted to be fitted to the housing.

In accordance with the invention, the handle which, for example, is already used for accommodating electronic components such as the ON-OFF switch or the electronic control means for the motor, is additionally employed as a heel rest. To increase the surface of the rest, it is further provided that an arm extends radially outwardly from the housing end more proximate to the processing tools, and that the free end of the arm includes a rest provided on the side remote from the housing and lying in the plane of the rest of the handle. The additional arm on the housing may also be used as an additional handle in the preparation of particularly heavy batters. A further increase in the rest surface is obtained by connecting the free ends of the handle and the arm by an extension and by providing the extension with a rest forming a common plane with the rests of the handle and the arm. The connection of the handle with the arm by means of the extension increases the rigidity of the portable mixer, so that any vibrations produced in the housing by the motor are largely reduced or dampened.

The ease of handling of the appliance is particularly improved in that the handle forms an angle of between 60° and 75° with the longitudinal axis of the housing. In particular an angle of 68° has proved to be optimal.

In accordance with the invention, it is particularly advantageous if the motor and the processing tool are arranged successively in longitudinal direction, if the handle includes an air duct for the supply or the discharge of cooling air, if the arm includes a further air duct for the supply or discharge of cooling air, and if both parts are interconnected through an extension combining with the parts to form a rest for the portable mixer. A portable mixer of this type avoids all the shortcomings described in the foregoing.

The invention will be described in more detail in the following with reference to the accompanying drawings. In the drawings, FIG. 1 is a side view of the portable mixer of the invention illustrating a first embodiment;

FIG. 4 is a top plan view of the portable mixer, as seen from the direction Z in FIG. 3;

FIG. 5 is a bottom plan view of the portable mixer, as seen from the direction X in FIG. 3.

To avoid repetitions, like parts have been assigned like reference numerals throughout the FIGS. 1 to 6.

FIGS. 1 to 6 show the portable mixer of the invention which is used for cutting, kneading, mixing, etc. It includes a substantially cylindrical housing 1 which accommodates a motor 19 and a gear box 20 for a variety of mixing, kneading and cutting inserts generally indicated at 5 and has formed thereon an elongated handle 2 which is adapted to be comfortably gripped by a hand and is arranged transversely to the housing 1 in a downward angular position.

Figure 1:
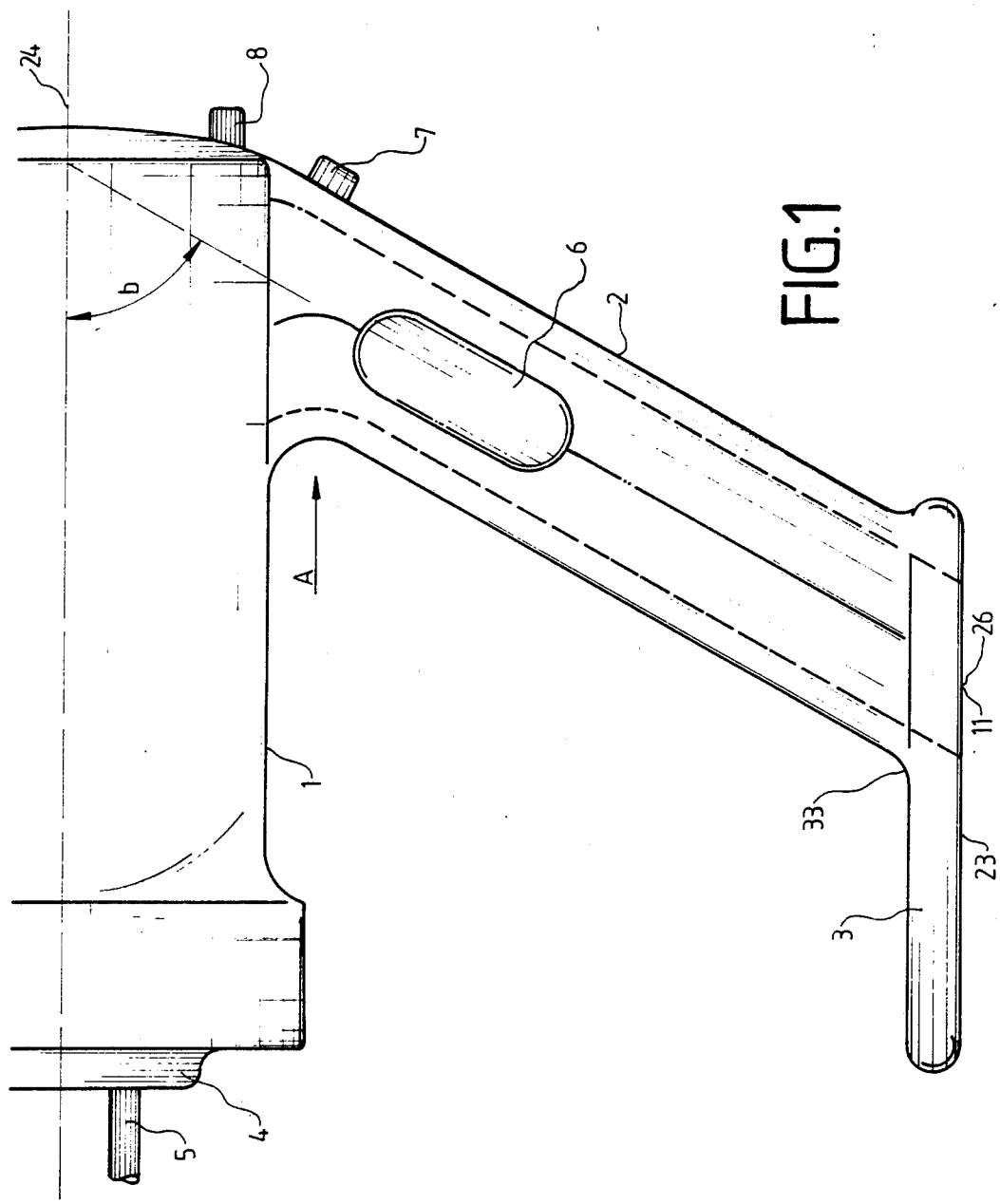
Figure 2:
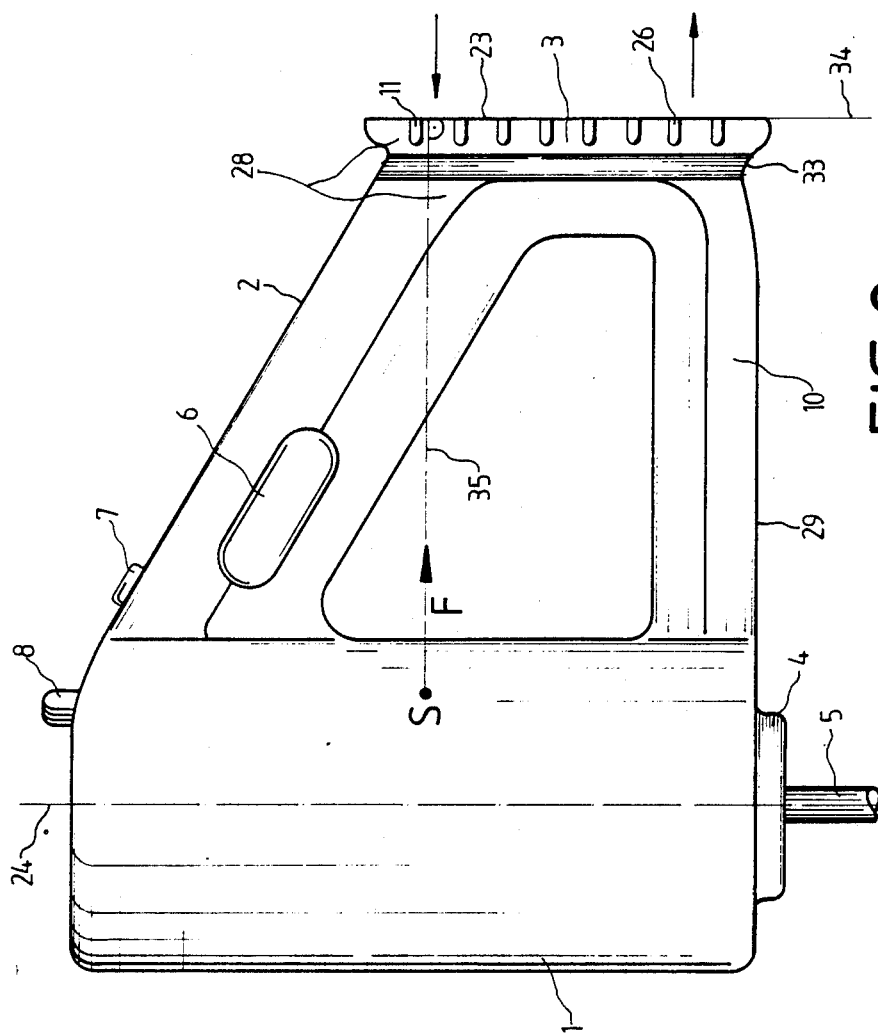
FIG. 2 is a side view of the portable mixer of the invention illustrating a second embodiment.

In FIG. 1, particularly the lower area A shows a marked radius between the surface of the handle 2 and the surface of the housing 1. Advantageously, this radius enables the portable mixer to be placed on the mixing bowl (not shown) which is frequently provided with a radiused rim. A short distance rearward of the area A, thumbholes 6 for thumb and index finger are provided on either side of the rounded surface of the handle 2 (FIGS. 1 and 2).

In accordance with FIGS. 1 to 6, the upper end of the handle 2 is provided with a stepping switch 7 which is movable transversely to the longitudinal extent of the handle. Protruding from the upper side of the housing 1 is an ejection button 8 which, when actuated, releases the processing tool 5 from its locking engagement with the receptacle 21 provided on the gear box 20, thereby causing it to fall out of its socket 13 in the portable mixer. The sockets 13, 14 which are connected with the locking means (not shown in greater detail) and their respective receptacles 21, 32 for the different processing tools 5 are provided in a preferably rimmed raised section 4 which is formed on the underside of the housing. As appears clearly from FIG. 3, the motor 19 and the processing tools 5 extend on the same longitudinal axis 24 of the housing 1, thus obviating the need for complex angular gear arrangements. The gear box 20 is located in the housing 1 between the motor 19 and the processing tools 5.

With the portable mixer temporarily off or also in operation, it can be placed on its rest 23 on a table top, not shown, conveniently and safely by means of an extension 3 formed on the free end of the handle 2 and extending parallel to the longitudinal axis 24 of the body of the appliance. However, this is only possible if, as shown in FIG. 2, for example, the force of gravity F originating from the center of gravity S of the portable mixer acts along the line 35 on the rest 23. Therefore, in FIG. 1 the rest 23 of the extension 3 on the side remote from the housing body 1, which extension is radiused at both the top and the bottom, is constructed as an enlarged rest of the handle, allowing also the portable mixer to stand on end with the processing tools 5 inserted, without the risk for the processing tools 5 to contact the table top, since they extend parallel to the table top. The stable position of the portable mixer with regard to the center of gravity is facilitated by the angular extension of the handle 2 (defined by angle b).

In FIGS. 2 to 6, the portable mixer shown in FIG. 1 has been extended by the added provision of an arm 10 connecting the bottom area of the housing 1 with the extension 3. This arm 10 which extends essentially normal to the housing 1 and radially outwardly combines with the extension 3, the adjacent handle 2 and the housing 1 to form a homogeneous and stable plastic case, with the arm 10 which has its sides radiused and its top and bottom flat (FIGS. 2 and 3) tapering from the housing body 1 towards the extension 3. The area between the housing body 1 and the arm 10 thus represents an enlargement 27 partly for the purpose of locating therein parts of the gear box 20.

Figure 6:
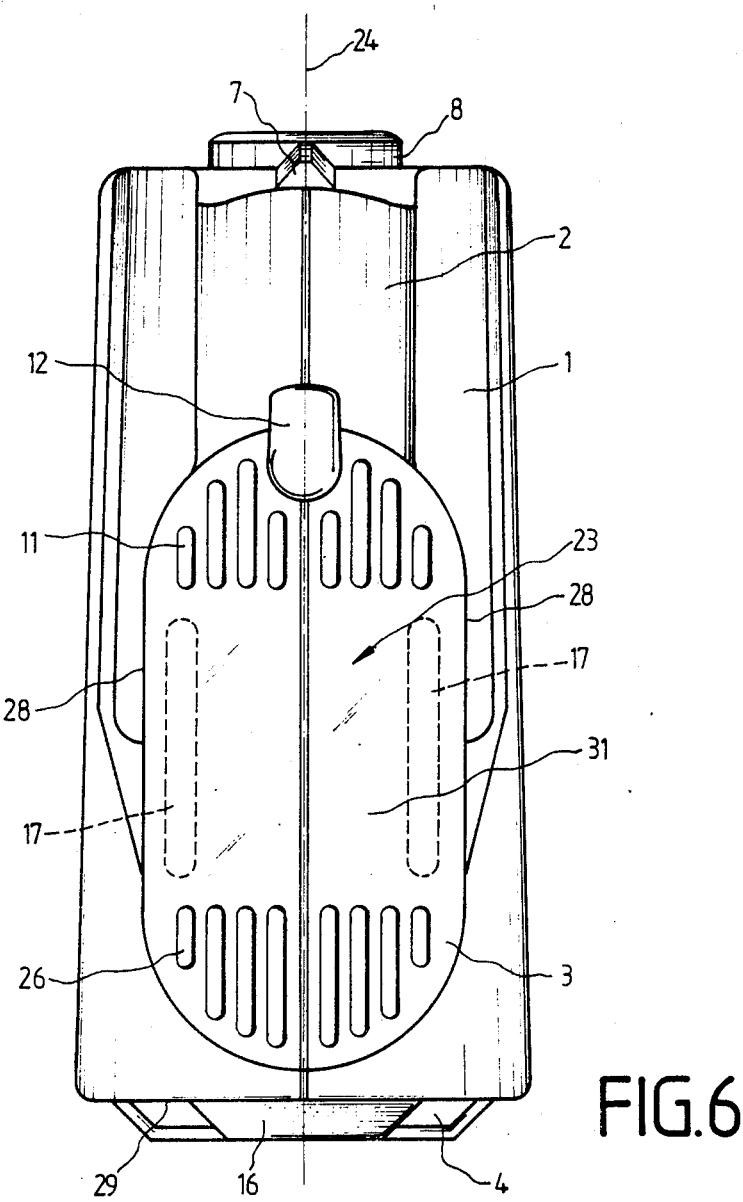
FIG. 6 is a rear view, as seen from the direction Y in FIG. 3.

In contrast to the portable mixer shown schematically in FIG. 1, the portable mixer illustrated in FIGS. 2 to 6 has an increased stability due to the arm which establishes an integral housing unit in combination with the extension 3 and the handle 2. The unit shown is a plastic shell case made of at least two parts. A compact DC motor is used as the motor 19, so that the cross section and the overall axial length of the body 1 are considerably reduced (also due to the accommodation of gear parts in the enlargement 27). In FIG. 6, the air vents 11, 26 are separated from one another by the web member 31. It will be understood that the possibility also exists to conduct the air in opposition to the direction of the arrows 38 through the air ducts 22, 30, 37, 25 of the portable mixer.

Figure 3:
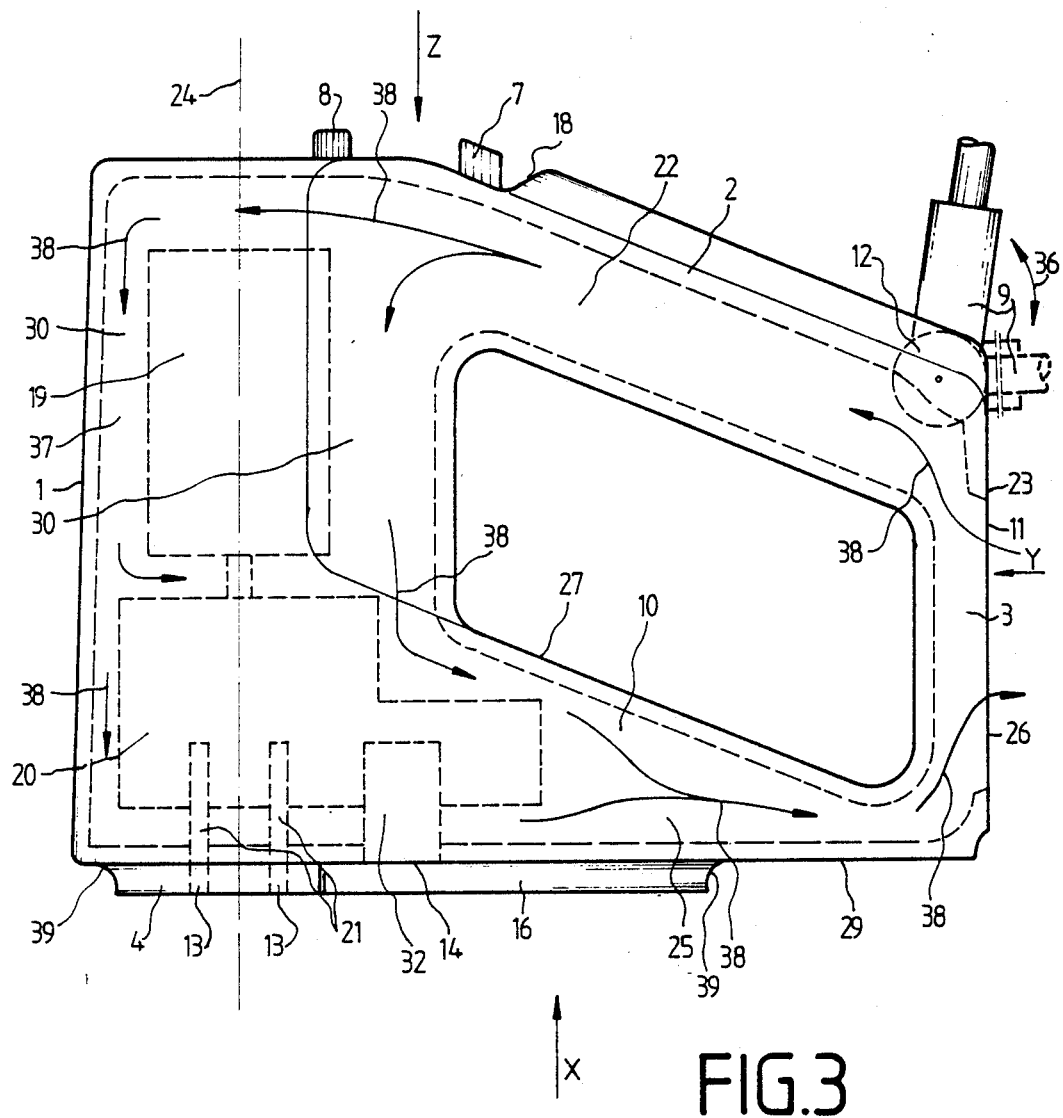
FIG. 3 is a side view of the portable mixer of the invention illustrating a third embodiment.

The plane underside 29 of the arm 10 which extends normal to the rest 23 includes a protruding elongated tongue 16 which is flush and approximately level with the section 4 and extends in the longitudinal direction of the arm 10 (FIGS. 3, 5 and 6). With the exception of the area 40 between the sections 4, 16, the edge areas 39 of both sections 4, 16 are relatively chamfered. In FIG. 5, the section 4 has its upper area conformed to the contours of the circumferential area of the housing 1 and has a diameter which is somewhat smaller than that of the housing. Where the cylindrical housing 1 adjoins the arm 10, the section 4 is provided with a stop edge 40. Adjoining this stop edge 40 is the forward stop edge 15 of the tongue 16 when the tongue 16 is in a position closing the socket 14.

The elongated tongue 16 having its both ends radiused is slidable against the force B of a spring means not shown (FIG. 5). This FIG. 5 shows the tongue 16 in its open position exposing the socket 14 for the insertion of a blending rod not shown. If, for example, the blending rod is removed on actuation of the ejection button 8, the spring force will cause the tongue 16 to slide back automatically into the closing position referred to above, the tongue thus closing the socket 14 which is of importance in particular when using the other processing tools 5 (two dough hooks or two whisk beaters) which are inserted into sockets 13 customarily located side by side in the forward round area of section 4 where they are locked in place by the receptacle means 21. The sockets 13 thus serve to receive two dough hooks, whisk beaters, etc. As the blending rod, these processing tools 5 are equally removed by pressing the ejection button 8.

If it is desired to place the portable mixer on the rear end 23 of the extension 3 also with the motor still running, it is possible, for example, to provide instead of the rest surface 23 spacer ribs 17 configured as foot elements indicated in broken lines, these ribs extending on either side of the rest 23 between the air vents 11, 26.

According to FIG. 4, a cavity 41 or recess is provided in the extension 3 and the adjoining handle 2 at the upper end of the rest 23 forming a plane 34, for receiving a swivel joint 12 for a power cord 9. To place the portable mixer on its rest 23, this swivel joint 12 makes it possible for the power cord 9 which may protrude from the rest 23 when the portable mixer is in operation (FIG. 3), to be swivelled upwards in the cavity 41, as indicated by the swivel direction 36 in FIG. 3.

As becomes apparent from FIG. 4, a recess 18 is provided in the forward area of the handle 2 proximate to the substantially circular upper side of the housing body 1, from which recess the stepping switch 7 protrudes to such an extent that its upper side which is conformed to the angular position of the handle 2 is approximately in alignment with the upper side of the handle. In this manner, the stepping switch 7 no longer protrudes inconveniently from the handle area upwardly, but lies embedded in the rounded recess 18.

In FIGS. 2, 4 and 5, the free end of handle and arm 10 includes in the area proximate to the extension 3 a channel 33 for receiving the power cord 9 if the portable mixer is not in use and is to be placed on its rest 23. To this end, it is only necessary to wrap the cord around the channel 33.

I claim:

1. An electrically powered portable mixer for processing food, including a housing (1) accommodating a motor (19), a gear box (20) and a receptacle means (21) connected to the gear box (20) for the fastening of processing tools (5), said housing having a longitudinal axis (24) a handle (2) for holding the portable mixer formed on said housing and extending transversely to said longitudinal axis (24) of said housing (1),
    at least one air duct (22) in said handle (2) to direct said cooling air towards said housing (1) from the outside and/or away from said housing (1), and air vent structure (11) on said handle (2) in communication with said air duct (22) for the passage of cooling air through the housing (1) for cooling the motor (19).

2. The portable mixer as claimed in claim 1 wherein at an end of said handle (2) air inlet and/or air outlet orifices are provided in the form of air vent structure forming the beginning and, respectively, the end of the air duct (22, 25).

3. The portable mixer as claimed in claim 2 wherein said air vent structure (26) directs the air stream out of the portable mixer transversely to the direction of the processing tool (5).

4. The portable mixer as claimed in claim 1 wherein an end of said handle (2) is provided with an extension (3) substantially parallel to the longitudinal axis (24) of said housing (1) and the processing tool (5), the air vents (11) being provided on the side (23) of the extension remote from the housing (1).

5. The portable mixer as claimed in claim 4, characterized in that the side (23) of the extension (3) remote from the housing is additionally constructed as a rest for the portable mixer.

6. The portable mixer as claimed in claim 4, characterized in that the air vents (11,26) extend also into the sides (28) of the extension (3).

7. The portable mixer as claimed in claim 4, characterized in that raised foot elements (17) are provided on the rest (23).

8. The portable mixer as claimed in any one of the claims 1 to 5, characterized in that the motor (19) and the processing tool are arranged successively in longitudinal direction (24).

9. The portable mixer as claimed in any one of the claims 1 to 5, characterized in that the handle (2) is formed on the upper area of the housing (1) opposite the processing tool (5) and extends downwardly at an angle.

10. The portable mixer as claimed in claim 9, characterized in that the handle (2) extends downwardly in the direction of the processing tool (5) at an angle (b) between 60° and 75° relative to the longitudinal axis (24) of the housing (1).

11. The portable mixer as claimed in claim 10, characterized in that a tongue (16) slidable transversely to the processing tools (5) is provided on the underside (29) of the arm (10), by means of which tongue at least one socket (14) and the associated receptacle means (21) can be closed.

12. The portable mixer as claimed in claim 1 or claim 4, characterized in that an arm (10) extending substantially vertically to the longitudinal axis (24) of the housing (1) is provided in the lower area of the housing (1) more proximate to the processing tool (5), and that said arm (10) includes a further air duct (25) for cooling the motor (19).

13. The portable mixer as claimed in claim 12, characterized in that the arm (10) is connected with the handle (2) through the extension (3), and that on the extension (3) air vents (11,26) are provided for both the admission and the discharge of the air from the air ducts (22,25).

14. The portable mixer as claimed in claim 13, characterized in that the air ducts (22,25) are interconnected through the housing (1) which accommodates the motor (19) and also serves as a further air duct (30), and that the air duct (22) serves as an air inlet and the air duct (25) as an air outlet.

15. The portable mixer as claimed in claim 14, characterized in that the air vents (11,26) formed on the extension (3) are separated from each other by a web member (31).

16. The portable mixer as claimed in claim 13, characterized in that a channel (33) is formed on the radial outer circumference of the extension (3).

17. The portable mixer as claimed in claim 12, characterized in that the arm (10) serves to accommodate the gear box (20) or part thereof.

18. The portable mixer as claimed in claim 17, characterized in that the arm (10) is provided with an enlargement (27) in the area proximate to the housing (1).

19. The portable mixer as claimed in claim 1, characterized in that a cavity for receiving and guiding a joint (12) of a power cord is provided in the upper part of the extension (3) adjacent to the handle (2), said joint being sealed against the air duct (22), and that the swivel direction (36) of the joint (12) of the power cord is in the longitudinal direction of the handle (2).

20. An electrically powered portable mixer for processing food, including a housing (1) accommodating a motor (19), a gear box (20) and a receptacle means (21) connected to the gear box (20) for the fastening of processing tools (5), said housing having a longitudinal axis (24) a handle (2) for holding the portable mixer formed on said housing and extending transversely to said longitudinal axis (24) of said housing (1), and air vent structure (11) for the passage of cooling air through the housing (1) for cooling the motor (19), said motor (19) and said processing tool (5) being successively arranged in the longitudinal direction (24) of said housing (1), an end of said handle (2) including a rest (23) on the side remote from said housing (1) and extending substantially parallel to the longitudinal axis (24) of said housing (1), said rest (23) being dimensioned such that, on placing the portable mixer on its rest (23), the line of action (35) of the force of gravity (F) of the portable mixer falling vertically on the plane (34) of said rest (23) impinges on said rest (23).

21. The portable mixer as claimed in claim 20, characterized in that the rest extends substantially parallel to the longitudinal axis (24) of the housing (1).

22. The portable mixer as claimed in claim 21, characterized in that an arm (10) extends radially outwardly from the housing end more proximate to the processing tools (5), and that the free end of said arm (10) includes a rest (23) provided on the side remote from the housing (1) and lying in the plane of the rest (23) of the handle (2).

23. The portable mixer as claimed in claim 22, characterized in that ends of the handle (2) and of the arm (10) are connected by an extension (3).

24. The portable mixer as claimed in claim 23, characterized in that the extension (3) is provided with a rest (23) forming a common place with the rests of the handle (2) and the arm (10).

25. The portable mixer as claimed in claim 20, characterized in that the handle (2) forms an angle (b) of between 60° to 75°, preferably 68°, with the longitudinal axis (24) of the housing (1).

26. The portable mixer as claimed in claim 22, characterized in that a circumferential channel (33) is provided at an end of handle (2) and arm (10).

27. The portable mixer as claimed in any one of the claims 22 to 26, characterized in that a recess for receiving and guiding a joint (12) of a power cord is provided on the upper side of the handle (2) at an end thereof, the swivel direction (36) of said joint being in the longitudinal direction of the handle (2).

28. The portable mixer as claimed in claim 20, characterized in that the handle (2) includes at least one air duct (22) for the supply of cooling air from outside to the housing (1) and/or for the discharge of cooling air away from the housing (1).

29. The portable mixer as claimed in claim 28, characterized in that an arm (10) extending substantially vertically to the longitudinal axis (24) of the housing (1) is provided in the lower area of the housing (1) more proximate to the processing tool (5), and that said arm (10) is provided with a further air duct (25) for cooling the motor (19).

* * * * *

REEXAMINATION CERTIFICATE (1919th)
United States Patent [19]

Kamprath

[11] B1 4,922,464

[45] Certificate Issued Feb. 2, 1993

[54] PORTABLE MIXER FOR PROCESSING FOOD

[75] Inventor: Karl-Heinz Kamprath, Wiesbaden, Fed. Rep. of Germany

[73] Assignee: Braun Aktiengesellschaft, Frankfurt, Fed. Rep. of Germany

Reexamination Request:
No. 90/002,680, Mar. 4, 1992

Reexamination Certificate for:
Patent No.: 4,922,464
Issued: May 1, 1990
Appl. No.: 334,682
Filed: Apr. 6, 1989

[30] Foreign Application Priority Data

May 4, 1988 [DE] Fed. Rep. of Germany ....... 3815177

[51] Int. Cl.⁵ ............................................ B01F 15/06
[52] U.S. Cl. .................................. 366/349; 366/144; 366/601
[58] Field of Search ............... 366/349, 348, 601, 297, 366/300, 299, 301, 342, 343, 344, 144, 149

[56] References Cited

FOREIGN PATENT DOCUMENTS 1173981 10/1971 Fed. Rep. of Germany .
3447741 6/1986 Fed. Rep. of Germany .

*Primary Examiner*—Robert W. Jenkins

[57] ABSTRACT

The invention is directed to an electrically powered portable mixer for processing food, including a housing 1 accommodating a motor 19, a gear box 20 and a receptacle means 21 connected to the gear box 20 for the fastening of processing tools 5. Provided on the housing 1 and extending transversely to the longitudinal axis 24 of the housing 1 is a handle 2 for holding the portable mixer, with air vents 11 which ensure the passage of cooling air through the housing 1 being provided on the housing 1 for cooling the motor 19. To cool the motor 19, the handle 2 incorporate at least one air duct 22 in which the cooling air is conducted towards the housing from outside and/or away from the housing 1.

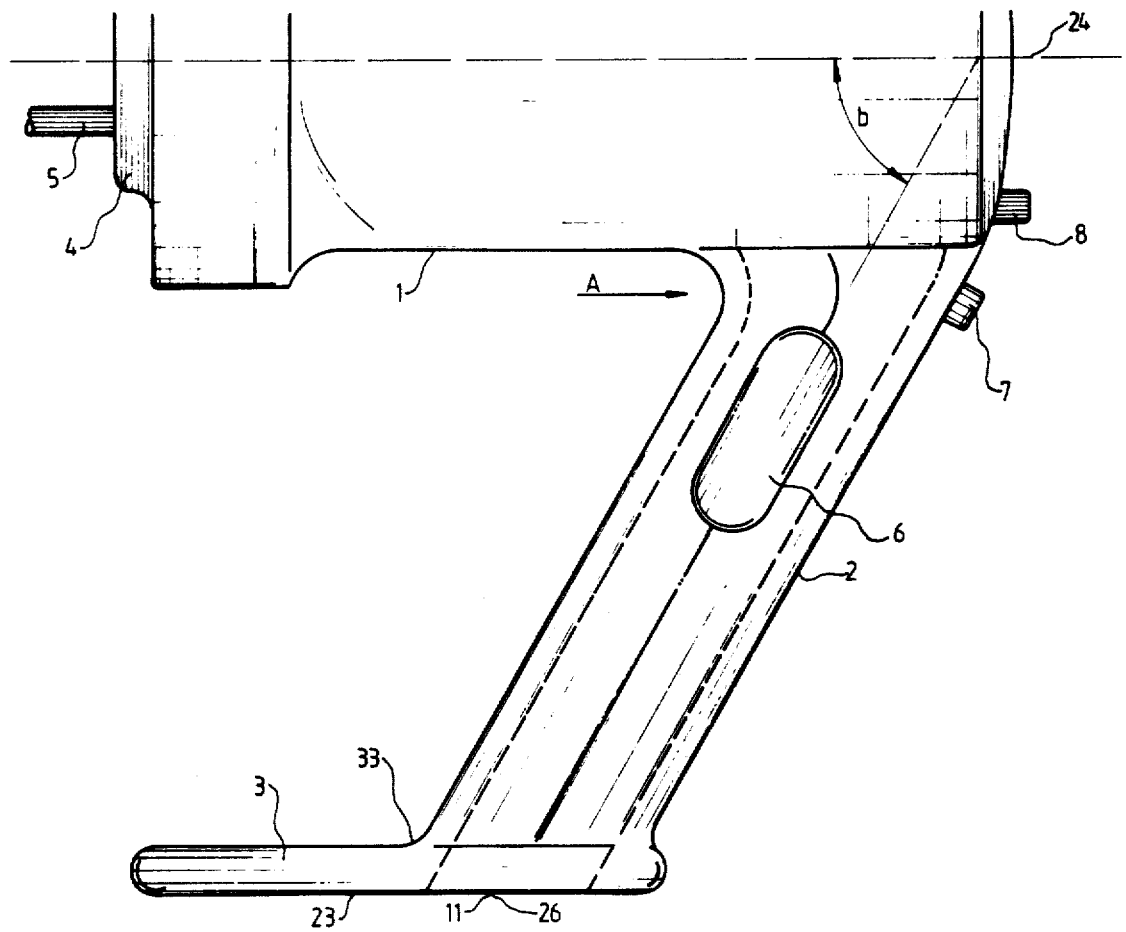

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 20–28 and 29 are confirmed.

Claims 2, 3, 8, 9, 12, 13 and 14 are cancelled.

Claims 1, 4–7, 10, 11, 15–18 and 19 are determined to be patentable as amended.

1. An electrically powered portable mixer for processing food [, including a] *comprising* housing [(1)] *structure* accommodating a motor [(19)], a gear box [(20)] and [a] receptacle means [(21)] connected to [the] *said* gear box [(20)] for the fastening of processing tools [(5)], said [housing having a] *motor, said gear box and said working tool receptacle means being successively arranged in the* longitudinal [axis] *direction (24)* [a handle (2) for holding the portable mixer formed on said housing and extending transversely to said longitudinal axis (24)] of said housing [(1)] *structure,*

[at least one air duct (22) in said] handle [(2) to direct said cooling air towards] *structure extending transversely to the longitudinal direction (24) of said* housing [(1) from the outside and/or away from said housing (1), and air vent structure (11) on] *structure* said handle [(2) in communication with said air duct (22) for the passage of] *structure being formed on the upper area of said housing structure opposite said working tool receptacle means and including air duct structure and air vent structure through which* cooling air [through the] *is guided to said housing structure from outside or away from said* housing [(1)] *structure* for cooling [the] *said* motor [(19)]*, and*

*arm structure extending in the same direction as said handle structure and transversely to said longitudinal direction (24) of said housing structure and in the lower area of said housing structure more proximate to said working tool receptacle means than said handle structure, said arm structure including further air duct structure and further air vent structure at its end remote from said housing structure for discharge of cooling air away from said housing structure or for supply of cooling air to said housing structure.*

4. The portable mixer as claimed in claim 1 wherein [an] *the* end of said handle [(2)] *structure* is provided with an extension [(3)] substantially parallel to [the] *said* longitudinal axis [(24)] of [said] *the* housing [(1)] *structure* and [the processing tool (5), the] air [vents (11) being] *vent structure is* provided on the side [(23)] of [the] *said* extension remote from [the] *said* housing [(1)].

5. The portable mixer as claimed in claim 4 [characterized in that] *wherein* the side [(23)] of [the] *said* extension [(3)] remote from [the] *said* housing *structure is additionally* constructed as a rest for the portable mixer.

6. The portable mixer as claimed in *either* claim 4[, characterized in that the] *or 5 wherein said* air [vents (11,26) extend also] *vent structure extends* into the sides [(28)] of [the] *said* extension [(3)].

7. The portable mixer as claimed in claim [4, characterized in that] *5 wherein said rest includes* raised foot elements [(17) are provided on the rest (23)].

10. The portable mixer as claimed in [claim 9, characterized in that the] *any one of claims 1, 4 or 5 wherein said* handle [(2)] *structure* extends downwardly in the direction of the [processing tool (5)] *working tool receptacle means* at an angle (b) of between 60° and 75° relative to the longitudinal axis [(24)] of [the] *said* housing [(1)] *structure.*

11. The portable mixer as claimed in [claim 10, characterized in that a] *any one of claims 1, 4 or 5 and further including* tongue [(16)] *structure on the under side of said arm structure in a direction transverse to said housing structure, said tongue structure being* slidable [transversely] *in a direction transverse* to [the processing tools (5) is provided on the underside (29) of the arm (10), by means of which tongue] *said housing structure and being adapted to close* at least [one socket (14) and the associated] *a portion of said working tool* receptacle means [(21) can be closed].

15. The portable mixer as claimed in claim [(14), characterized in that the] *4, wherein said* air vent [(11,26)] *structures* formed on said extension [(3)] are separated from each other by a web member [(31)].

16. The portable mixer as claimed in claim [13, characterized in that a] *4 or 5 and further including* channel [(33) is] *structure* formed on the radial outer circumference of [the] *said* extension [(3)].

17. The portable mixer as claimed in claim [12, characterized in that the] *1 wherein said* arm [(10)] *structure* serves to accommodate [the] *said* gear box [(20)] or part thereof.

18. The portable mixer as claimed in claim [17, characterized in that the] *6 wherein said* arm [(10)] *structure* is provided with an enlargement [(27)] in the area proximate to [the] *said* housing [(1)] *structure.*

19. The portable mixer as claimed in claim [1, characterized in that] *4 or 5 and further including* a cavity for receiving and guiding a *swivel* joint [(12)] of a power cord [is provided] in the upper part of [the] *said* extension [(3)] adjacent [the] *to said* handle [(2)] *structure,* said joint being sealed against [the] [(2)] *said* air duct [(22)] *structure,* and [that] the swivel direction [(36)] of [the] *said* joint of the power cord [is] *being* in the longitudinal direction of [the] *said* handle [(2)] *structure.*

* * * * *